(12) United States Patent
Mattos

(10) Patent No.: US 7,491,019 B1
(45) Date of Patent: Feb. 17, 2009

(54) EROSION PREVENTION SYSTEM AND METHOD OF USE

(76) Inventor: Manuel A. Mattos, 3689 W. Ellery Ave., Fresno, CA (US) 93711

( * ) Notice: Subject to any disclaimer, the term of this patent is extended or adjusted under 35 U.S.C. 154(b) by 0 days.

(21) Appl. No.: 11/850,744

(22) Filed: Sep. 6, 2007

(51) Int. Cl.
*E02B 11/00* (2006.01)

(52) U.S. Cl. ................................. 405/302.6; 405/41
(58) Field of Classification Search .............. 405/40, 405/41, 36, 302.6
See application file for complete search history.

(56) References Cited

U.S. PATENT DOCUMENTS

| | | | |
|---|---|---|---|
| 778,323 A * | 12/1904 | Martin | 405/41 |
| 4,102,137 A | 7/1978 | Porraz et al. | |
| 4,135,843 A | 1/1979 | Umemoto et al. | |
| 5,253,952 A * | 10/1993 | Selway | 404/25 |
| D386,653 S | 11/1997 | Brown | |
| 6,109,835 A | 8/2000 | Grabhorn | |
| D456,224 S | 4/2002 | Lancaster | |
| 2004/0238028 A1* | 12/2004 | Taylor et al. | 137/59 |
| 2004/0238037 A1* | 12/2004 | Taylor et al. | 137/364 |
| 2006/0153648 A1 | 7/2006 | Carpenter | |
| 2006/0263151 A1 | 11/2006 | McMahon | |

* cited by examiner

*Primary Examiner*—Frederick L Lagman

(57) ABSTRACT

An erosion prevention system and method of use for diverting and deflecting water from an irrigation pipe to inhibit erosion of ground adjacent to the irrigation pipe includes an irrigation pipe extending upwardly from the ground. An open top end of the irrigation pipe permits water in the irrigation pipe to exit the irrigation pipe and irrigate the ground. A deflection plate is positioned around the irrigation pipe and placed on the ground. The deflection plate deflects and disperses the water exiting the irrigation pipe to inhibit the water from eroding the ground adjacent to the irrigation pipe.

3 Claims, 3 Drawing Sheets

EROSION PREVENTION SYSTEM AND METHOD OF USE

BACKGROUND OF THE INVENTION

Field of the Invention

The present invention relates to liquid runoff barriers and more particularly pertains to a new liquid runoff barrier for diverting and deflecting water from an irrigation pipe to inhibit erosion of ground adjacent to the irrigation pipe.

SUMMARY OF THE INVENTION

The present invention generally comprises an irrigation pipe extending upwardly from the ground. An open top end of the irrigation pipe permits water in the irrigation pipe to exit the irrigation pipe and irrigate the ground. A deflection plate is positioned around the irrigation pipe and placed on the ground. The deflection plate deflects and disperses the water exiting the irrigation pipe to inhibit the water from eroding the ground adjacent to the irrigation pipe.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
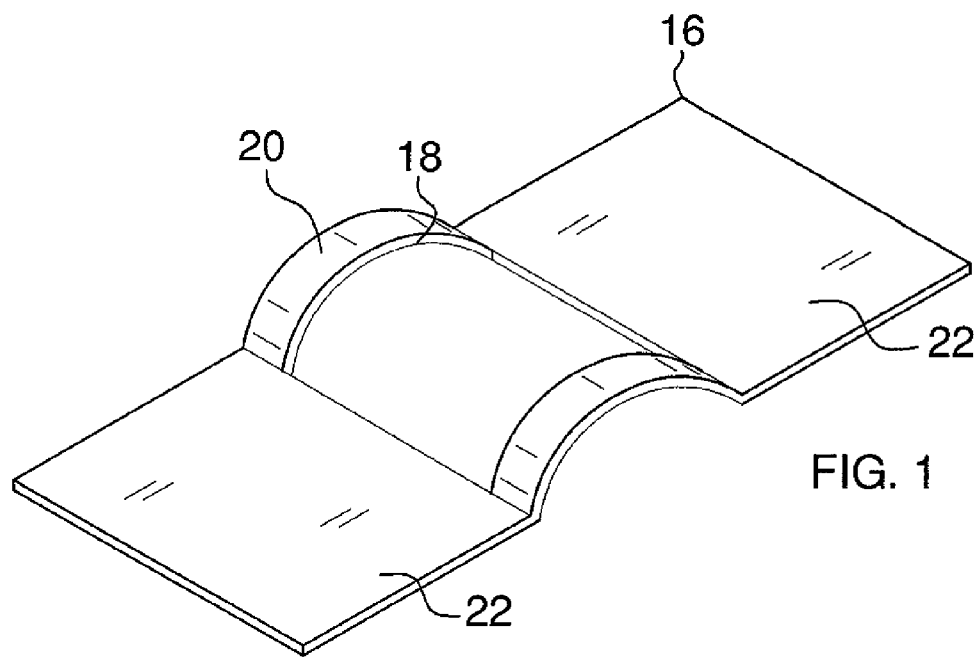
FIG. 1 is a perspective view of a deflection plate an erosion prevention system according to the present invention.
Figure 2:
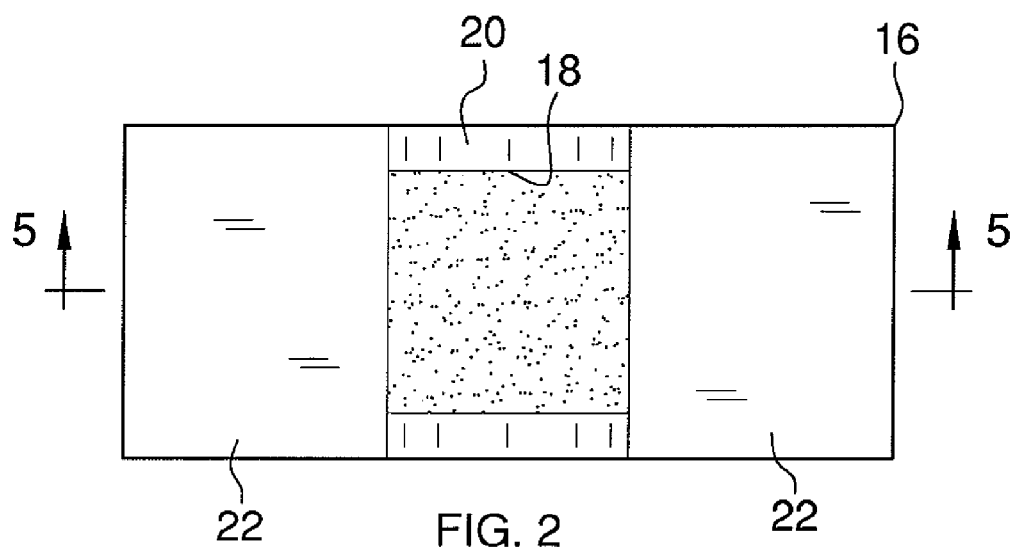
FIG. 2 is a top view of the present invention.
Figure 3:
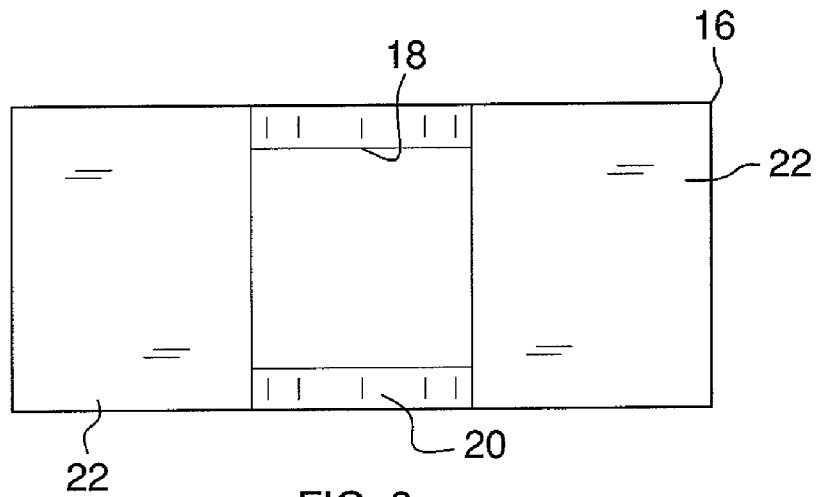
FIG. 3 is a bottom view of the present invention.
Figure 4:
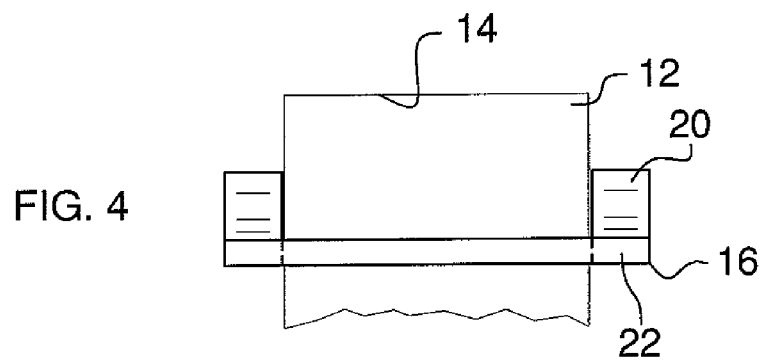
FIG. 4 is a side view of the present invention.
Figure 5:
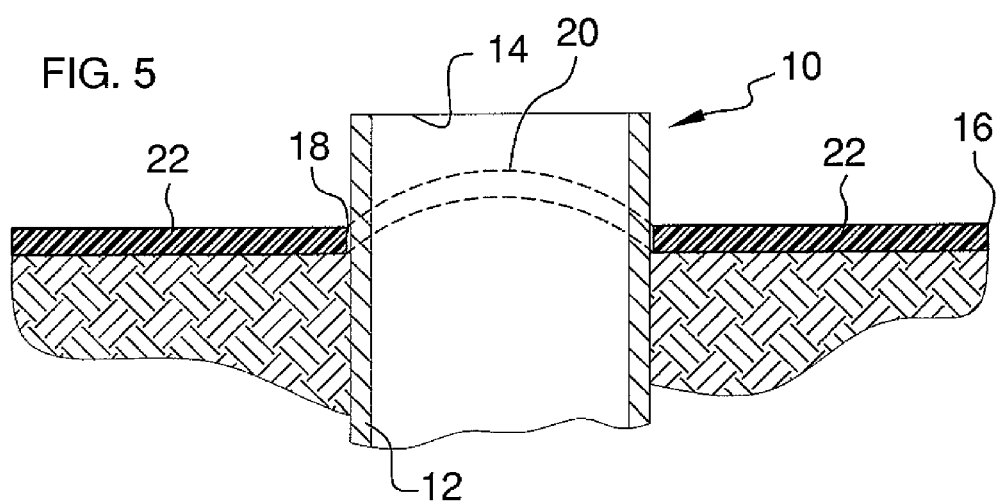
FIG. 5 is a cross-sectional view of the present invention taken along line 5-5 of FIG. 2.

With reference now to the drawings, and in particular to FIGS. 1 through 6 thereof, a new liquid runoff barrier embodying the principles and concepts of the present invention and generally designated by the reference numeral 10 will be described.

As best illustrated in FIGS. 1 through 6, the erosion prevention system and method of use 10 generally comprises an irrigation pipe 12 extending upwardly from the ground. An open top end 14 of the irrigation pipe 12 permits water in the irrigation pipe 12 to exit the irrigation pipe 12 and irrigate the ground.

Figure 6:
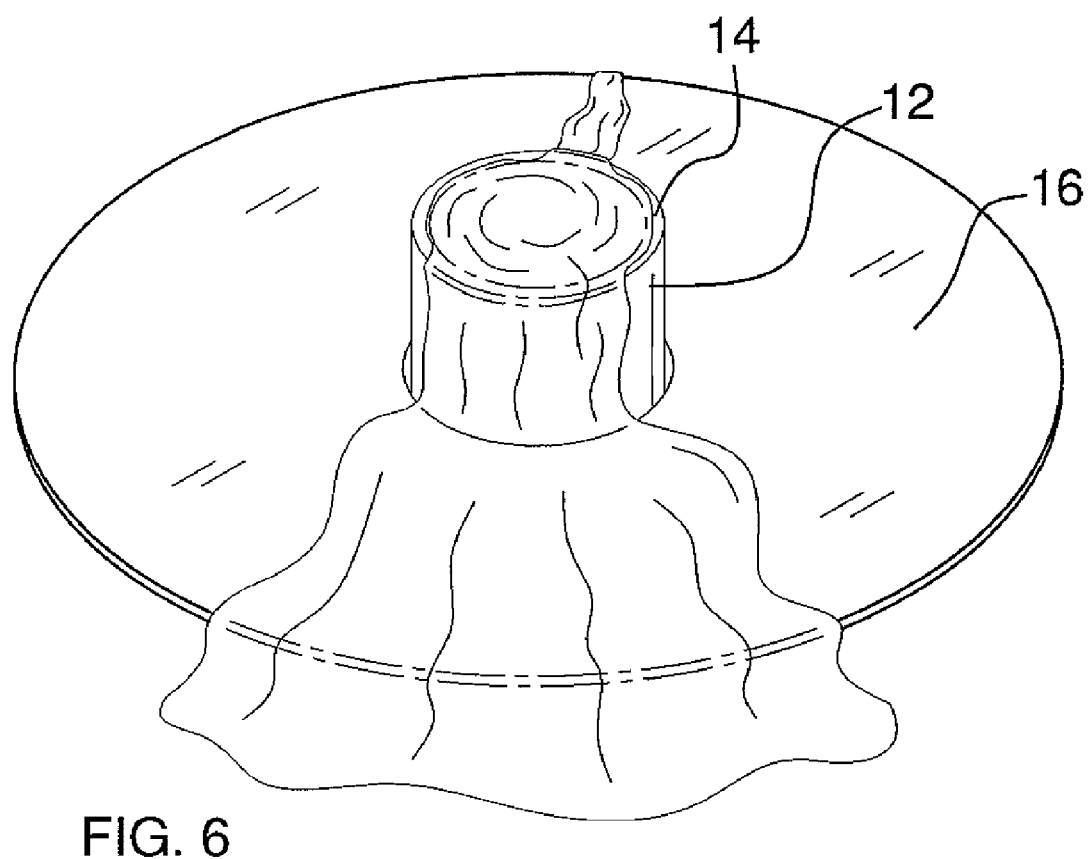
FIG. 6 is a perspective view of an embodiment of the present invention shown in use.

A deflection plate 16 is positioned around the irrigation pipe 12 and placed on the ground. The deflection plate 16 deflects and disperses the water exiting the irrigation pipe 12 to inhibit the water from eroding the ground adjacent to the irrigation pipe 12. The deflection plate 16 has a central aperture 18 extending therethrough. The central aperture 18 receives the irrigation pipe 12 and permits the irrigation pipe 12 to extend through the deflection plate 16. The defection plate, as shown in FIGS. 1 through 5, has a thickness between approximately ⅛ inch to ¼ inch, a length of approximately 43 inches and a width of approximately 17 inches. The embodiment of the deflection plate 16, as shown in FIG. 6, has a thickness between approximately ⅛ inch to ¼ inch and a diameter of approximately 16 inches. The deflection plate 16 is comprised of rigid material.

The deflection plate 16 includes a center section 20 that is arcuate to extend over a berm of dirt positioned adjacent to the irrigation pipe 12. The center section 20 has the central aperture 18 extending therethrough. The center section 20 extends upwardly above a plane of a remainder of the plate. The deflection plate 16 includes a pair of wing sections 22. Each of the wing sections 22 is coupled to the center section 20 and extends in opposite directions from one another. The wing sections 22 deflect and disperse the water from the irrigation pipe 12.

In use, the deflection plate 16 is placed over the irrigation pipe 12 so that the irrigation pipe 12 extends through the central aperture 18. The center section 20 is positioned over the berm. The deflection plate 16 is placed on the ground. Water is permitted to flow through the irrigation pipe 12 and out of the open top end 14 of the irrigation pipe 12. The water from the irrigation pipe 12 is deflected and diverted by the deflection plate 16 to inhibit erosion of the ground around the irrigation pipe 12 when the ground adjacent to the irrigation pipe 12 is irrigated.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An erosion prevention system comprising:

an irrigation pipe extending upwardly from the ground, an open top end of said irrigation pipe permitting water in said irrigation pipe to exit said irrigation pipe and irrigate the ground; and a deflection plate being positioned around said irrigation pipe and placed on the ground, said deflection plate deflecting and dispersing the water exiting said irrigation pipe to inhibit the water from eroding the ground adjacent to said irrigation pipe, said deflection plate having a central aperture extending therethrough, said central aperture receiving said irrigation pipe and permitting said irrigation pipe to extend through said deflection plate, said deflection plate including a center section being arcuate to extend over a berm of dirt positioned adjacent to said irrigation pipe, said center section having said central aperture extending therethrough, said center section extending upwardly above a plane of a remainder of said plate.

2. An erosion prevention system comprising:

an irrigation pipe extending upwardly from the ground, an open top end of said irrigation pipe permitting water in said irrigation pipe to exit said irrigation pipe and irrigate the ground; and a deflection plate being positioned around said irrigation pipe and placed on the ground, said deflection plate deflecting and dispersing the water exiting said irrigation pipe to inhibit the water from eroding the ground adjacent to said irrigation pipe, said deflection plate having a central aperture extending therethrough, said central aperture receiving said irrigation pipe and permitting said irrigation pipe to extend through said deflection plate, said deflection plate including a center section being arcuate to extend over a berm of dirt positioned adjacent to said irrigation pipe, said center section having said central aperture extending therethrough, said center section extending upwardly above a plane of a remainder of said plate, said deflection plate including a pair of wing sections, each of said wing sections being coupled to said center section and extending in opposite directions from one another, said wing sections deflecting and dispersing the water from said irrigation pipe.

3. A method for inhibiting erosion comprising;

providing an erosion prevention system, said erosion prevention system comprising;

an irrigation pipe extending upwardly from the ground, an open top end of said irrigation pipe permitting water in said irrigation pipe to exit said irrigation pipe and irrigate the ground;

a deflection plate being positioned around said irrigation pipe and placed on the ground, said deflection plate deflecting and dispersing the water exiting said irrigation pipe to inhibit the water from eroding the ground adjacent to said irrigation pipe, said deflection plate having a central aperture extending therethrough, said central aperture receiving said irrigation pipe and permitting said irrigation pipe to extend through said deflection plate, said deflection plate including a center section being arcuate to extend over a berm of dirt positioned adjacent to said irrigation pipe, said center section having said central aperture extending therethrough, said center section extending upwardly above a plane of a remainder of said plate, said deflection plate including a pair of wing sections, each of said wing sections being coupled to said center section and extending in opposite directions from one another, said wing sections deflecting and dispersing the water from said irrigation pipe;

placing of said deflection plate over said irrigation pipe so that said irrigation pipe extends through said central aperture;

positioning of said center section over the berm;

placing of said deflection plate on the ground;

permitting water to flow through said irrigation pipe and out of said open top end of said irrigation pipe; and deflecting and diverting of the water from said irrigation pipe by said deflection plate to inhibit erosion of the ground around said irrigation pipe when the ground adjacent to said irrigation pipe is irrigated.

* * * * *